(12) United States Patent
Phukan

(10) Patent No.: US 6,486,335 B1
(45) Date of Patent: Nov. 26, 2002

(54) PROCESS FOR THE PREPARATION OF REFINED HARD SUGARCANE WAX HAVING IMPROVED QUALITIES FROM PRESS MUD

(75) Inventor: Amal C. Phukan, Assam (IN)

(73) Assignee: Council of Scientific & Industrial Research (CSIR), New Delhi (IN)

( * ) Notice: Subject to any disclaimer, the term of this patent is extended or adjusted under 35 U.S.C. 154(b) by 0 days.

(21) Appl. No.: 09/052,133

(22) Filed: Mar. 31, 1998

(51) Int. Cl.[7] .................................................. C11B 3/00
(52) U.S. Cl. ............................ 554/206; 554/8; 554/20; 554/21; 554/191; 554/210
(58) Field of Search ................................ 554/191, 206, 554/210, 8, 20, 21

(56) References Cited

PUBLICATIONS

Chem. Abstr., 106:69000, 1987.*

Chem. Abstr., 109:24452, 1988.*

Chem. Abstr., 112:9003, 1990.*

* cited by examiner

*Primary Examiner*—Deborah D. Carr
(74) *Attorney, Agent, or Firm*—Dinesh Agarwal, P.C.

(57) ABSTRACT

The present invention relates to a process for the preparation of refined hard sugarcane wax having improved qualities from press mud which comprises digesting press mud with a non polar solvent in the presence of activated charcoal and separating the sugarcane wax from the residue.

3 Claims, No Drawings

PROCESS FOR THE PREPARATION OF REFINED HARD SUGARCANE WAX HAVING IMPROVED QUALITIES FROM PRESS MUD

This invention relates to a process for the preparation of refined hard sugarcane wax having improved qualities from press mud Sugarcane wax (the hard variety) is a replacement of the commonly used carnauba wax. By nature sugarcane wax (the hard variety) is a type of microcrystalline wax having a high potential used in preparation of several important industrial products. Its potential use is wide in industry. The refined variety of the hard sugarcane wax having its potential use in: (a) Medicines, (b) in sweet meats and pastries, (c) in tinned food products, (d) in castings and recordings, (e) in carbon papers, (f) in preparation of carbonless carbon papers, (g) in electrical insulation of cables and wires, (h) in preparation of various types of paints, varnishes and polishes including shoe polishes, car polishes and floor polishes, (i) in preparation of coloured pencils, crayons, water and oil paints, (j) in cosmetics, (k) in preparation of emulsion paints for spraying. In fact, it has its most likely entries into all the branches of industries where carnauba wax is mostly used. In bulk also it can be produced many times more than any other plant waxes combined together. The raw material, press mud is a rejected waste material of sugarcane industries, that causes the unwanted problem of pollution to the surrounding supurbs of the sugar mills on accumulation. Also, the availability of the press mud is no problem at all throughout the year. While carnauba plant is a seasonal plant that produces extractable waxes only in marked period of a year.

(ii) The CHEMISTRY and TECHNOLOGY of WAXES by ALBIN H. WARTH Wax Research Consultant, Formerly Chemical Director The Crawn Cork and Seal Company Baltimore, Md.
REINHOLD PUBLISHING CORPORATION New York CHAPMAN & HALL LTD., LONDON.

The mode and the process of refining sugarcane wax (the hard variety) as mentioned above probably implies high acid values and saponification numbers to the presently available refined hard sugarcane wax of the world market.

The value of the wax increases with its colour and refining techniques. In the known process isolation of sugarcane wax from press mud (sugarcane press mud) is done commercially by use of solvents such as benzene, toluene, heptane and sometimes turpentine oils. The production of sugarcane wax is mainly been done only in one or two places in the world commercially. In India, Ravalgaon Sugar Industry prepares some amount of cane wax for its own use. The refining of the crude cane wax has been done by these industries by methods described in brief on the previous page.

The main object of the present invention is to develop a process for isolation and refining crude sugarcane-wax by using polar solvent such as carbon tetrachloride ($CCl_4$) and activated charcoal. Another object of this invention is to provide a process which can produce hard wax having low acid values and low saponification number. Still another object of this invention is to produce simultaneously soft wax, pitch and starting material for agro manures as by-product.

The use of activated charcoal in refining crude sugarcane wax has not yet been included in industries producing sugarcane wax from press mud wastes. This is so because it is considered to be a mild agent for performing refining of sugarcane wax. Stronger refining agents such as sulphuric acid, nitric acid and chromic acids are presently being used for refining sugarcane wax in industry. Further refining of the industrial sugarcane wax is being done by the use of low pressure vacuum distillations. Probably, by the use of such methods (acid treatment) may be the cause of imparting higher acid values and higher saponification numbers to the presently available limited quantities of hard sugarcane wax of the world market.

Accordingly, the present invention provides a process for the preparation of refined hard sugarcane wax having improved qualities from press mud which comprises
(1) digesting press mud with a non polar solvent such as carbon tetrachloride ($CCl_4$), benzene ($C_6H_6$) or toluene ($C_7H_8$) in presence of activated charcoal, where in the ratio of the non polar solvent:activated charcoal:press mud ranges from 3 liters to 1.50 liters:50 gm to 20 gm:1 kg to 500 gm (60 to 75:1:20 to 25);
(2) separating the residue by known methods;
(3) removing the solvent by conventional methods followed by treating the crude sugarcane wax obtained with hot isopropyl alcohol to get the wax in solution and pitch as residue;
(4) separating the said wax in solution by known methods and cooling to room temperture so as to get the said wax precipitated;
(5) washing thoroughly with water till the isopropyl alcohol is removed and drying to get the hard sugarcane wax;
(6) if desired recycling the isopropyl alcohol (I.P.A.) to step (3) and then treating the said sugarcane wax with hot water for further refining.

The present invention provides a better process than the existing commercial method of isolation and refining of sugarcane hard wax having low acid values and saponification numbers from press mud waste. In the process of the present invention carbon tetrachloride ($CCl_4$) has been used as solvent for extraction of press mud in isolating sugarcane wax. This solvent has not yet been used industrially for extraction of sugarcane wax from press mud. In the extraction of press mud by the method of the present invention, carbon tetrachloride has been found as efficient as any other polar solvents used industrially for the purpose. Moreover, $CCl_4$ have its advantages also. It is non-carcenogenic and non-imflamable. Activated charcoal is used for refining the crude cane wax. The product, sugarcane wax obtained by this process has a nominal acid value and saponification number. The colour of the hard wax obtained is light cream in colour, which is being highly preferred in the present world market. This is being made clear in the Table 1. The product by the process of the present invention is being compared with that of the commercial product present in the American market.

TABLE 1

| | HARD SUGARCANE WAX FROM | | | |
|---|---|---|---|---|
| | Present Process | | American market | |
| Chemical characteristic determined | Refined product | Double refined product | Refined product | Double refined product |
| 1. Colour | Light yellow (Cream) | Light cream | Light brown | Dull yellow |
| 2. Melting point ° C. | 72° C. to 75° C. | 80° C. to 82° C. | 78° | 77° C. to 82° C. |
| 3. Specific gravity | 0.975 to 0.978 | 0.955 to 0.961 | 0.991 to 0.999 | 0.961 to 0.970 |
| 4. Acid value | 6.64 | 3.78 | 13 | 8 to 23 |
| 5. Saponification number | 6.894 | 2.90 | 57 | 55 to 95 |

A reference can be made to page number 228 of THE CHEMISTRY AND TECHNOLOGY OF WAXES BY ALBIN h. WARTH.

This process of the present invention is a successfully developed method of acquiring high grade refined sugarcane wax (the hard variety) by using $CCl_4$ for extraction of press mud and activated charcoal for refining the wax extracted. The use of mineral acids and distillation at reduced pressure employed in the hitherto known process for refining the crude wax and the hard wax obtained has been successfully avoided. For further refining, the wax obtained was treated and melted in hot water and then cooled to room temperature to recover the wax. This process removes any water soluble impurities if present, from the wax. This product prepared by the present invention has a nominal acid value and saponification number, and, in appearance, the wax is creamy-coloured lumps.

According to the present process, the air-dried press mud was digested with a nonpolar organic solvent, such as carbon tetrachloride ($CCl_4$), benzene ($C_6H_6$) and toluene ($C_4 6_6$) in the ratio of 2:3 to 2:5 at a temperature range of 80° C. to 90° C. (for $CCl_4$ and benzene) and up to 110° C. for tolouene. The digestion of the press mud has been done with any of these solvents for about 3 (three) to 7 (seven) hours at a stretch in presence of activated charcoal. The digested lot has been cooled to room temperature and filtered under subjection to vacuum filtration system by the use of an exhaust pump The residues on the filter pad washed three to four times (washings may be extended is necessary) to eight to ten times with clean small lot of fresh extracting aluquots, the washings added to the bulk of the filtrate in the collecting flask. The solvent recovered by distillation and the crude wax obtained transferred to a dried weighed empty beaker. Further removal of the solvent was performed by heating and removing the solvent at a temperature in the range of 80° C. to 100° C. For this a constant boiling water batch or a controlled heating mantle proves handy. The final removal of the solvent has been done in a vacuum desicator subjected to reduced pressure with a connected exhaust pump. The crude wax after being weighed was treated with hot isopropyl alcohol (I.P.A) at 1:3 to 1:6 ratio. All the waxes dissolved and a black compound remained adhered to the bottom of the beaker. This is the calcium-magnesium salts of waxy acids and resin acids. It is very sticky in nature. The hot solution of waxes was poured into a clean dried beaker and the interior of the first beaker washed several times with small lot (about 10 ml portion) I.P.A. for each washing and ringing, and decanted into the second beaker containing wax solution in I.P.A. The second beaker has been left to attain the room temperature so that the hard sugarcane wax separate out The hard wax has been retained on the filter pad on subjection to vacuum filtration by the use of an exhaust pump. The hard wax on the filter pad has been washed several times with small lot (about 10 to 50 ml portion) of fresh I.P.A. The hard wax on the filter pad has been subjected to air drying by letting air pass through the filter pad with the wax with the aid of the exhaust pump. The final drying has been done by heating the funnel with the wax at about 40° C. to 45° C. in an electric oven for about 30 minutes to 1 hour, and then subjected to exhaust in a vacuum desicator. Then the wax has been detached from the filter pad and dried further. The dried wax (physically powdery in character) has been melted and made into hard lumps of refined sugarcane wax (hard variety) cream-coloured in appearance. For further refining, the dried wax has been melted in clean hot water and the wax being recovered from the re-cooled water. This treatment removes and reduces any water soluble impurities if present in the hard sugarcane wax prepared.

In the execution of the experiments and extractions mentioned above previously, activated charcoal has been used for refining the waxes obtained.

The yield of wax obtained by the process concerned has been 5.00 to 5.50% hard wax and 4.00 to 4.50% soft wax.

Proper removal of the isopropyl alcohol (I.P.A.) has been found to be necessary because presence of I.P.A. in the hard wax portion (even in small amount) found to form colloidal layer when being treated with hot water, and this colloidal property remains as such even when the water wax part concerned has been brought down to the room temperature.

The process of the present invention is being further illustrated by the following practical examples which should not, however, be construed to limit the scope of the invention.

EXPERIMENT 1

(i) Taken 1 kg weight of air-dried press mud
(ii) 50 gm of activated charcoal
(iii) 3 liters carbon tetrachloride ($CCl_4$)
(iv) Isopropyl alcohol (I.P.A.), Laboratory reagent, 2 liters
(v) Ten nos. of glass beads.

Digested on a heating mentle for 4 hours at a stretch under refluxing arrangements. The wax obtained being treated with I.P.A. as mentioned previously.

Products Obtained

| | | |
|---|---|---|
| Hard wax obtained | = | 5.20% |
| Soft wax obtained | = | 4.10% |
| Pitch obtained | = | 0.12% |

EXPERIMENT 2

| | | |
|---|---|---|
| (i) Air-dried press mud taken | = | 500 gm |
| (ii) $CCl_4$ extractant taken | = | 1.50 litres |
| (iii) Activated charcoal taken | = | 20.00 gm |
| (iv) Boiling beads (glass) taken | = | 5 nos. |

(v) I.P.A. (Isopropyl alcohol) Laboratory reagent=1 liter.
Digested as mentioned in Expt. 1 and the wax treated with I.P.A. as already mentioned.

Products Obtained

| | | |
|---|---|---|
| Hard wax obtained | = | 5.35% |
| Soft wax obtained | = | 4.00% |
| Pitch obtained | = | 0.12% |

EXPERIMENT 3

| | | |
|---|---|---|
| (i) Air-dried press mud taken | = | 1000 gm |
| (ii) Activated charcoal taken | = | 50 gm |
| (iii) Toluene ($C_7H_6$) taken | = | 3 litres |
| (iv) Isopropyl alcohol (Laboratory reagent) | = | 2 litres. |

Digested as mentioned in Expt. 1 and 2, treatment of wax obtained with I.P.A. being as in Expts. 1&2.

Products Obtained

| | | |
|---|---|---|
| Hard wax | = | 5.50% |
| Soft wax | = | 4.20% |
| Pitch | = | 0.15% |

Here the wax obtained was coloured slightly dark. So the product extracted was redissolved in $CCl_4$ with activated carbon and experiment completed as in Expts. 1&2.

The amount of hard cream-coloured wax obtained=5.05%
The amount of soft wax obtained=3.85%
The amount of pitch obtained=0.15%

EXPERIMENT 4

| | | | |
|---|---|---|---|
| (i) Taken air-dried press mud | = | 500 | gm |
| (ii) Taken toluene ($C_7H_6$) | = | 1.50 | gm |
| (iii) Taken activated carbon | = | 20.00 | gm |
| (iv) Taken glass beads | = | 5 | nos. |
| (v) Taken isopropyl alcohol (I.P.A.) Lab. grade | = | 1 | litre. |

Digestion being done and wax obtained being treated with IPA as mentioned in Expt. 4 (toluene digestion of the press mud taken).
Product Obtained

| | | |
|---|---|---|
| (i) Hard wax | = | 5.40% |
| (ii) Soft wax | = | 3.80% |
| (iv) Pitch | = | 0.12% |

EXPERIMENT 5

| | | | |
|---|---|---|---|
| (i) Taken air-dried press mud | = | 1000 | gm |
| (ii) Activated charcoal | = | 50 | gm |
| (iii) Benzene ($C_6H_6$) | = | 3 | litres |
| (iv) Isopropyl alcohol (I.P.A.) Lab. grade | = | 2 | litres. |

Products Obtained

| | | |
|---|---|---|
| Hard wax | = | 5.50% |
| Soft wax | = | 4.20% |
| Pitch | = | 0.12% |

EXPERIMENT 6

| | | | |
|---|---|---|---|
| (i) Taken air-dried press mud | = | 500 | gm |
| (ii) Taken benzene ($C_6H_6$) | = | 1.50 | litres |
| (iii) Taken activated charcoal | = | 20 | gm |
| (iv) Taken glass beads | = | 5 | Nos. |
| (v) Isopropyl alcohol (I.P.A.) Laboratory reagent | = | 1 | litre. |

Products Obtained
Hard wax=5.25%
Soft wax=3.85%
Pitch=0.11%

Though benzene ($C_6H_6$) is found to be an excellant solvent to work on press mud, it is being carefully avoided from using in further extractions as it is an inflamable solvent and have carcinogenic property.

The wax obtained from employing the above stated experiments were carefully freed of isopropyl alcohol before setting it in desired shapes and also before the treatment with hot water.

Besides the hard sugarcane wax, the by-products of the extractions of press mud also have potential uses such as:

(i) Soft wax portion: It is a mixture of straight chained lipids as established by NMR spectras. It is a source of useful steroids that have their potential and vital uses in medicines and in birth control drugs. Reference can be made to the books (i) Sugar Series, 3 by-products of the Cane sugar industry, by J. M. Paturau, (ii) THE CHEMISTRY AND TECHNOLOGY OF WAXES, by ALBIN H. WARTH. (As stated earlier).

(iii) Pitch: A dark coloured compound of calcium and magnesium salts of wax acids and resin acids. It bears a sticky adhesive character. It has its potential uses in adhesive industries.

(iv) The fibrous residues left over: It forms the biggest part of materials in the constitution of the press mud. The de-waxed residues are enriched with useful organic and inorganic salts like organic matters, nitrogenous salts, phosphates, phosphatides and phosphites, potash bearing elements and salts. Its possible use as a agricultural manure is promising. Field experiments are being arranged to be performed at the earliest to investigate on its possible process of progress as a manure.

I claim:

1. A process for the preparation of refined hard sugarcane wax having improved qualities from press mud which comprises:

(a) digesting press mud with a non polar solvent such as carbon tetrachloride ($CCl_4$), benzene ($C_6H_6$) or toluene ($C_7H_B$) in presence of activated charcoal, wherein the ratio of the non polar solvent to activated charcoal: press mud ranges from 3 liters to 1.50 liters:50 gm to 20 gm:1 kg to 500 gm (60 to 75:1:20 to 25):

(b) separating the residue by known methods;

(c) removing the solvent by conventional methods followed by treating the crude sugarcane wax obtained with hot isopropyl alcohol to get the wax in solution and pitch as residue;

(d) separating the said wax in solution by known methods and cooling to room temperature so as to get the said wax precipitated;

(e) washing thoroughly with water till the isopropyl alcohol is removed and drying to get the hard sugarcane wax;

(d) if desired recycling the isopropyl alcohol (I.P.A.) to step (c) and then treating the said sugarcane wax with hot water for further refining.

2. A process as claimed in claim 1 where the digestion is effected at a temperature in the range of 80° C. to 110° C. with non polar organic solvents selected from carbon tetrachloride ($CCl_4$) benzene, toluene in the ration 2:3 to 2:5.

3. A process as claimed in claim 1 wherein the digestion of the press mud is done with solvents like $CCl_4$ for about 3–7 hours at a stretch in the presence of activated charcoal.

* * * * *